(12) United States Patent
Torres (10) Patent No.: US 9,089,751 B1
(45) Date of Patent: Jul. 28, 2015

(54) BATTING PRACTICE TRAINER

(71) Applicant: Iky A. Torres, Bronx, NY (US)

(72) Inventor: Iky A. Torres, Bronx, NY (US)

(*) Notice: Subject to any disclaimer, the term of this patent is extended or adjusted under 35 U.S.C. 154(b) by 0 days.

(21) Appl. No.: 14/086,411

(22) Filed: Nov. 21, 2013

(51) Int. Cl.
*A63B 69/00* (2006.01)
*A63B 24/00* (2006.01)
*A63B 71/06* (2006.01)

(52) U.S. Cl.
CPC ......... *A63B 69/0002* (2013.01); *A63B 24/0087* (2013.01); *A63B 71/0622* (2013.01); *A63B 2069/0008* (2013.01); *A63B 2071/0658* (2013.01); *A63B 2243/0004* (2013.01)

(58) Field of Classification Search
USPC .................. 473/451–456; 273/371, 374, 376
See application file for complete search history.

(56) References Cited

U.S. PATENT DOCUMENTS

| | | | | | |
|---|---|---|---|---|---|
| 4,142,717 | A | * | 3/1979 | Monaco | 473/453 |
| 4,676,511 | A | * | 6/1987 | Mackie | 273/376 |
| 5,029,873 | A | * | 7/1991 | Davis | 273/376 |
| 5,368,293 | A | * | 11/1994 | Waugh | 473/431 |
| 5,419,549 | A | * | 5/1995 | Galloway et al. | 473/431 |
| 5,921,896 | A | * | 7/1999 | Boland | 482/83 |
| 6,186,134 | B1 | * | 2/2001 | Battersby et al. | 124/78 |
| 2005/0085321 | A1 | * | 4/2005 | Diveglio | 473/453 |

* cited by examiner

*Primary Examiner* — Mark Graham
(74) *Attorney, Agent, or Firm* — Michael I. Kroll (57) ABSTRACT

A batting practice device for developing and enhancing a baseball player's batting skills. The device provides a computer program, control module, batting target with a display module and a target mounted display. The bat may have a weighted end or a weight within the body of the bat, which will develop batter's upper body strength.

5 Claims, 11 Drawing Sheets

BATTING PRACTICE TRAINER

BACKGROUND OF THE INVENTION

1. Field of the Invention

The present invention relates generally to targets and, more specifically, to a batter practice device. The present invention is a batting practice device for developing and enhancing baseball players batting skills. The device provides a computer program, control module, and target with an optional display module and target mounted display. It should also be noted that the bat may have a weighted end or a weight within the body of the bat, which will develop batter's upper body strength.

2. Description of the Prior Art

There are other devices which provide for batting practice. While these batting practice devices may be suitable for the purposes for which they where designed, they would not be as suitable for the purposes of the present invention as heretofore described.

It is thus desirable to provide a batting practice device that will provide batting practice that will increase upper body strength and enable batters to practice any of a plurality of specific pitch types in random fashion.

It is further desirable to provide a batting practice device comprising a batting target having a plurality of illuminable target elements that are singularly illuminable through selection of a pitching module from a plurality of pitching modules provide by computer application.

SUMMARY OF THE PRESENT INVENTION

A primary object of the present invention is to provide a batter with a batter's practice device to increase body strength and batting skills.

Another object of the present invention is to provide a batter's practice device comprising a computer controlled batter's target having a plurality of illuminable target elements that are randomly illuminated by said computer program.

Yet another object of the present invention is to provide a batter's practice device wherein said batter's target incorporates a circuit having a power source, processor, memory, and software in electrical communication with a control module whereby a batter can actuate the practice device and select from a plurality of pitching modules.

Still yet another object of the present invention is to provide a batter's practice device further providing a control module where by a batter can select a particular practice module from a plurality of modules, such as fast ball, knuckle ball, slider, curve, high ball, low ball, inside or outside pitches or a completely random module that will illuminate any of the illuminable target elements.

An additional object of the present invention is to provide a batter's practice device wherein said batters target provides a base as an anchor to prevent movement of the batter's target during use.

A further object of the present invention is to provide a batter's practice device wherein said batters target optionally provides wheels whereby said batters target is portable.

A yet further object of the present invention is to provide a batter's practice device wherein each of the plurality of targets has an impact portion with a centrally disposed illuminateable portion providing for the illumination of said illuminateable portion.

A still yet further object of the present invention is to provide a batters practice device wherein said impact portion further provides a compression element providing feedback when the impact portion is impacted.

Another object of the present invention is to provide a batters practice device wherein said impact portion further provides a compression element providing feedback when the impact portion is impacted.

Yet another object of the present invention is to provide a batter's practice device that optionally provides for the target device having a message display providing feedback to the batter after impacting one of said target elements.

Still yet another object of the present invention is to provide a batter's practice device wherein said feedback may include an actuator, such as a sensor, that displays a computer programmed message on the optional monitor or target display.

An additional object of the present invention is to provide a batters practice device wherein said impact portion further provides a compression element providing feedback when the impact portion is impacted.

A further object of the present invention is to provide a batters practice device wherein said optional monitor is used by said computer program to display a pitcher pitching a ball at the target device wherethen in realistic time one of the target elements will illuminate.

Additional objects of the present invention will appear as the description proceeds.

The present invention overcomes the shortcomings of the prior art by providing a batting practice device for developing and enhancing baseball players batting skills. The device provides a computer program, control module, and target with an optional display module and target mounted display. It should also be noted that the bat may have a weighted end or a weight within the body of the bat, which will develop batter's upper body strength.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the batting practice device of the present invention. With regard to the reference numerals used, the following numbering is used throughout the various drawing figures.

20 batting practice device
22 batter to use device 20
24 control module of device 20
26 batting target of device 20
28 display monitor of device 20
30 target element of batting element 26
32 bat of batter 22
34 base for batting target 26
38 tensioned impact portion of target element 30
40 illuminable portion of target element 30
41 light (laser or LED) in batting target 26
42 front wall of batting target 26
44 back wall of batting target 26
46 side wall of batting target 26
48 top wall of batting target 26
50 bottom wall of batting target 26
52 rail on bottom wall 50
54 track in base 34
56 receptacle in front wall 42
58 resilient compression element in batting target 26
60 rearwardly depending wall of impact portion 38
62 aperture in impact portion 38
64 motion sensor for target element 30
66 message display on top wall 48
68 wall mount fastener of device 20
70 wall of building
72 handle on side wall 46
74 sledge hammer for bat 32
76 processor of device 20

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
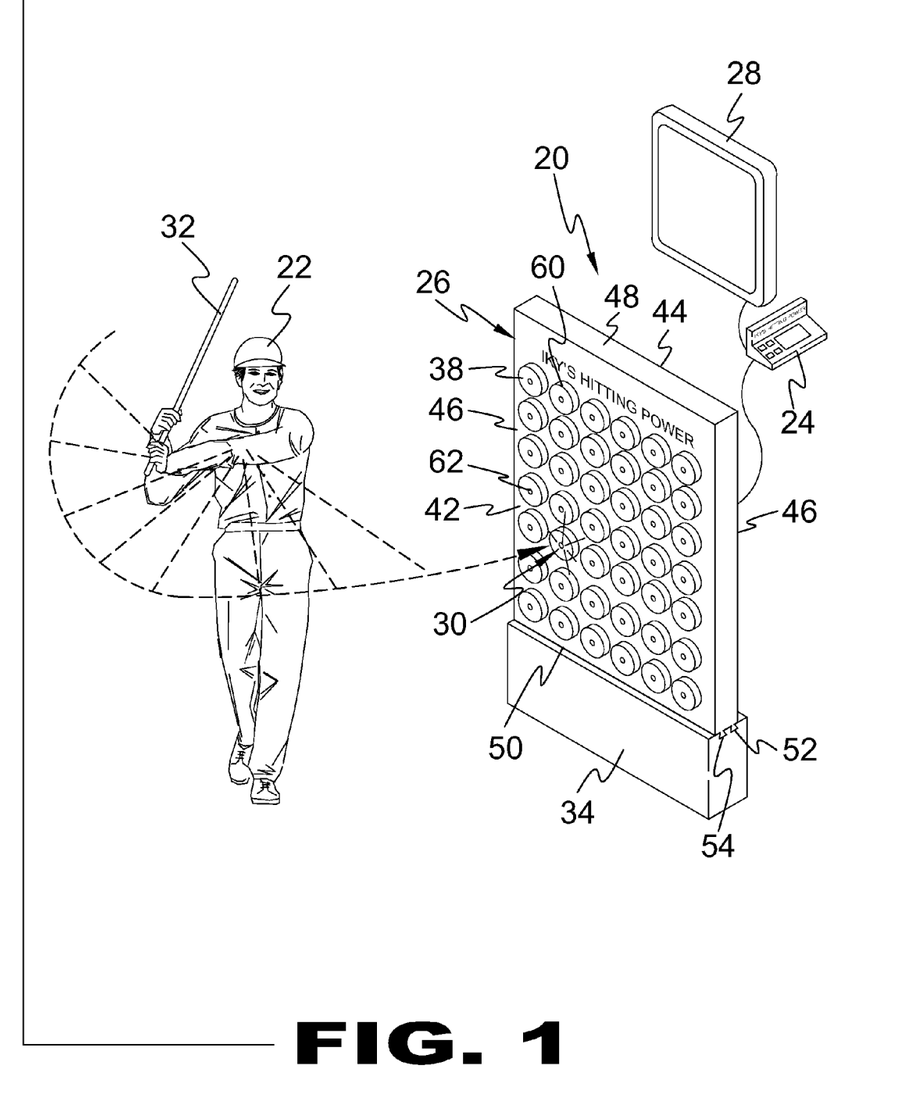
FIG. 1 is an illustrative view of the batting practice device of the present invention in use.

Referring to FIG. 1, shown is an illustrative view of the batting practice device of the present invention in use. The present invention is a batting practice device 20 for developing and enhancing a baseball batter 22 batting skills. The device 20 provides a computer program control module 24 and a batting target 26 with an optional display monitor 28 and target elements 30 mounted on the batting target 26. It should also be noted that bat 32 may have a weighted end or a weight within the body of the bat 32, which will develop upper body strength of batter 22.

Figure 2:
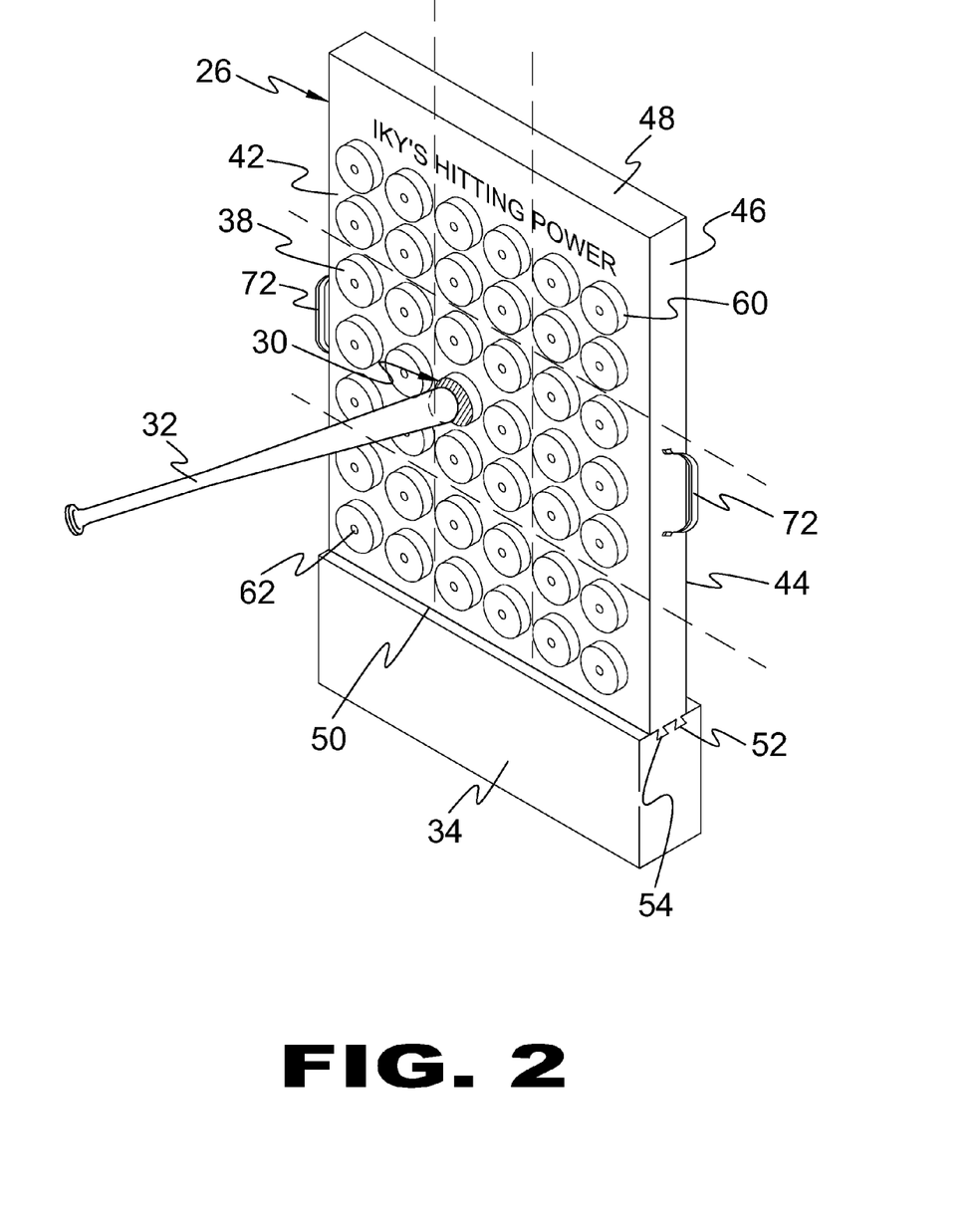
FIG. 2 is a perspective view of the present invention in use.

Referring to FIG. 2, shown is a perspective view of the present invention in use. The present invention provides a batting practice device 20 having a plurality of computer program controlled illuminable target elements 30, whereby the batter 22 evaluates whether to swing, strike the illuminated target elements 30, which may be in or out of the strike zone. The computer program controls which of the target elements 30 are illuminated depending on which of the computer programs of the control module 24 is selected. Selection may be for batting practice of a particular type of pitch or may be a random target element 30 illumination. Furthermore, the present invention provides for a certain number of target elements 30 to illuminate using one color representing the strike zone. A second color for those target elements 30 around the strike zone and a third color for peripheral target elements 30, considered ball high, low, inside and outside.

Figure 3:
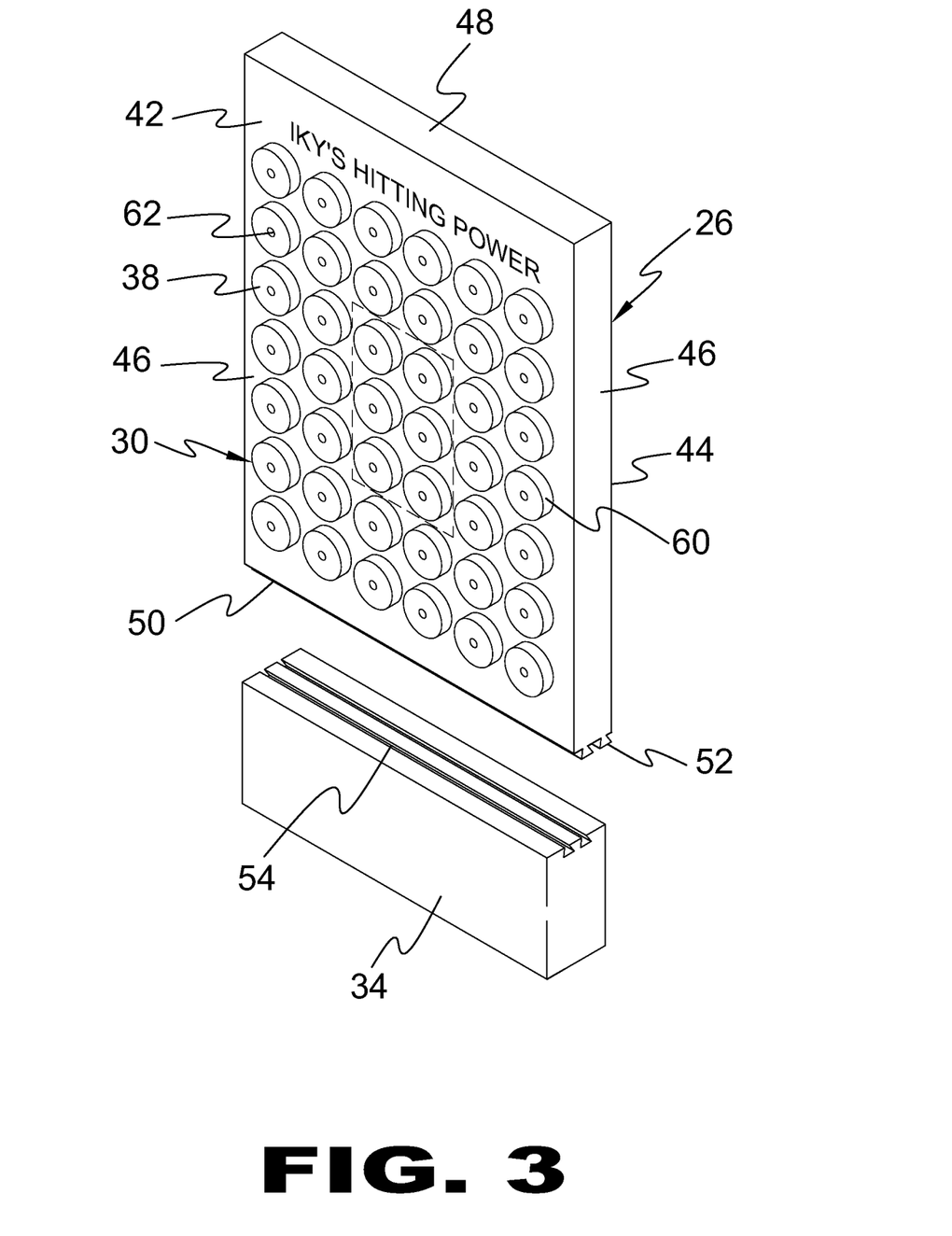
FIG. 3 is a perspective view of the batting target of the present invention.

Referring to FIG. 3, shown is a perspective view of the batting target of the present invention. The present invention provides the batting target 26 with a plurality of computer program controlled illuminable target elements 30 and a base 34. The batting target 26 and base 34 are matingly engaged to prevent the batting target 26 from moving during batting practice. Each of the individual target elements 30 has a tensioned impact portion 38 and a centrally disposed illuminable portion 40 which provides for the illumination of the illuminable portion 40. A light 41 being a laser or LED is preferably spaced away from the target element 30 to project a beam of light onto the illuminable portion 40.

Figure 4:
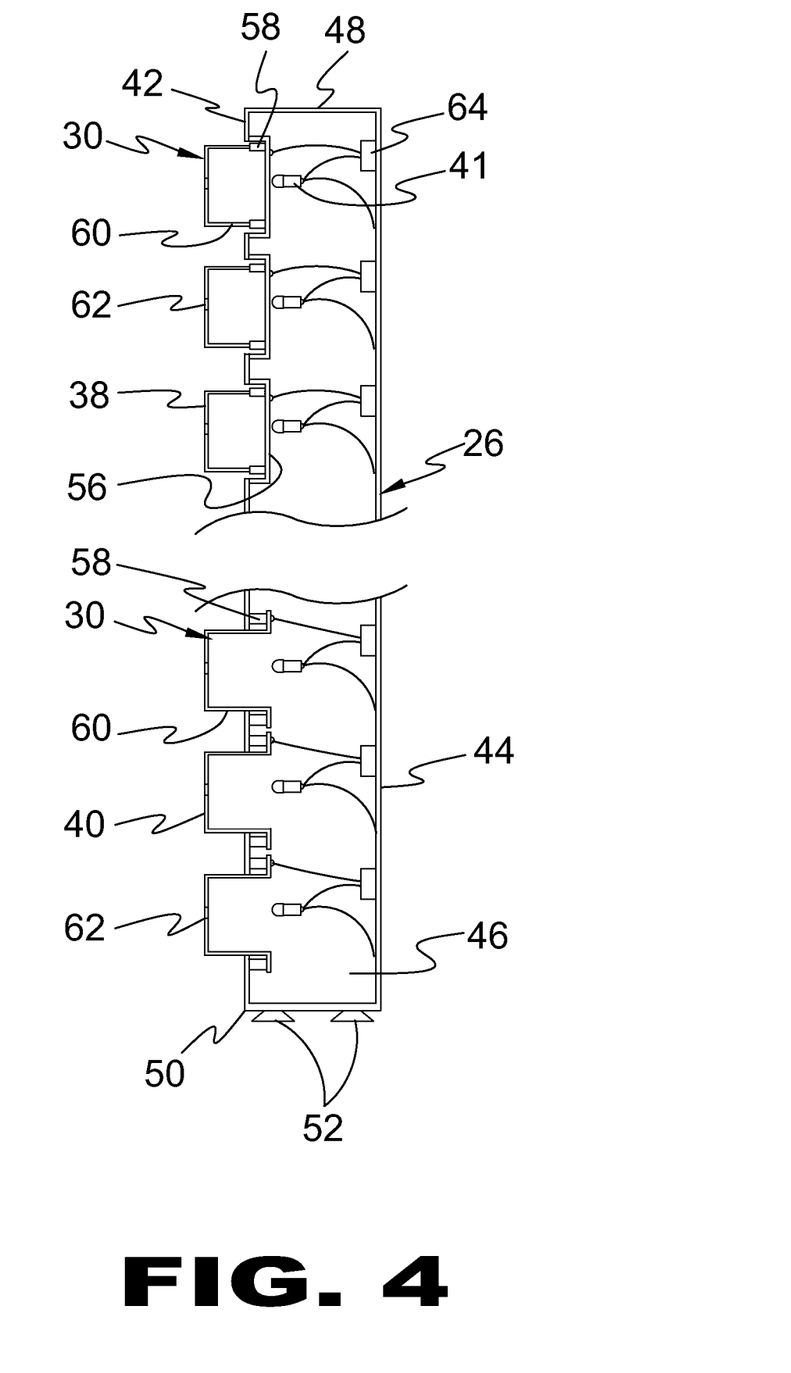
FIG. 4 is a sectional view of the batter target of the present invention.

Referring to FIG. 4, shown is a sectional view of the batter target of the present invention. Depicted is a sectional view of the batting target 26 comprising a front wall 42, back wall 44, side walls 46, top wall 48 and bottom wall 50. The exterior surface of the bottom wall 50 provides one or more rails 52 that mate with tracks 54 within the base 34 preventing movement of the batting target 26 during use. The front wall 42 has a plurality of longitudinal and transverse receptacles 56 for a corresponding plurality of target elements 30. Target elements 30 comprise an impact portion 38 resiliently mounted within a respective receptacle 56, so that a force applied to the impact portion 38 is absorbed by a resilient compression element 58 returning the impact portion 38 to its original position. The impact portion 38 has a front surface with a rearwardly depending wall 40 that matingly engages the compression element. 58. The impact portion 38 front surface has an aperture 62 for passage of a beam of light, thereby indicating to the batter 22 the intended target element 30. The present invention envisions a transparent or translucent lens that may be fixedly attached within the aperture 62, thereby diffusing the beam across the lens. Furthermore, each of the target elements 30 may incorporate a motion sensor 64 as actuator of feedback to the computer application that may display a message across an optional message display 66, shown in FIG. 5, fixedly attached to the top wall 48 of the batting target 26.

Figure 5:
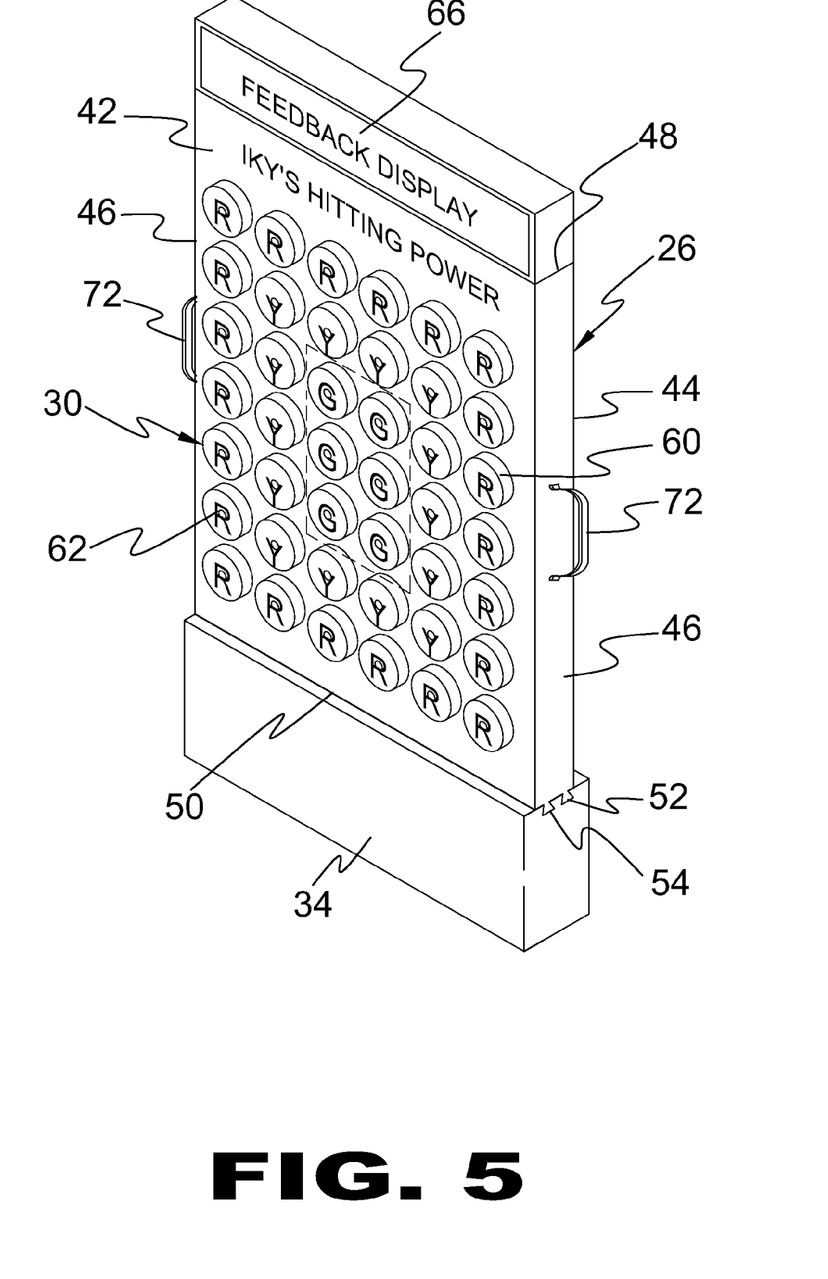
FIG. 5 is a perspective view of the batter target of the present invention.

Referring to FIG. 5, shown is a perspective view of the batter target of the present invention. Illustrated is the batting target 26 of the present invention. The batting target 26 has a plurality of target elements 30. Each target element 30 is fixedly attached within a respective receptacle 56 by a resilient compression element 58 with all target elements 30 having a front surface aperture 62 for illumination by a light beam. Different colors are used to indicate whether a ball, visually depicted as an illuminate target element 30, is within the strike zone as one color, with another color indicating just outside the strike zone and another color well outside of the strike zone. For illustrative purposes only, the strike zone color is green, with the strike zone periphery target elements 30 illuminated with yellow, followed by red illumination for the outermost periphery target elements 30. Also shown is the batting target 26 having a top mounted message display 66 that provides feedback, such as how was the swing: early, late, properly hit, home run, etc.

Figure 6:
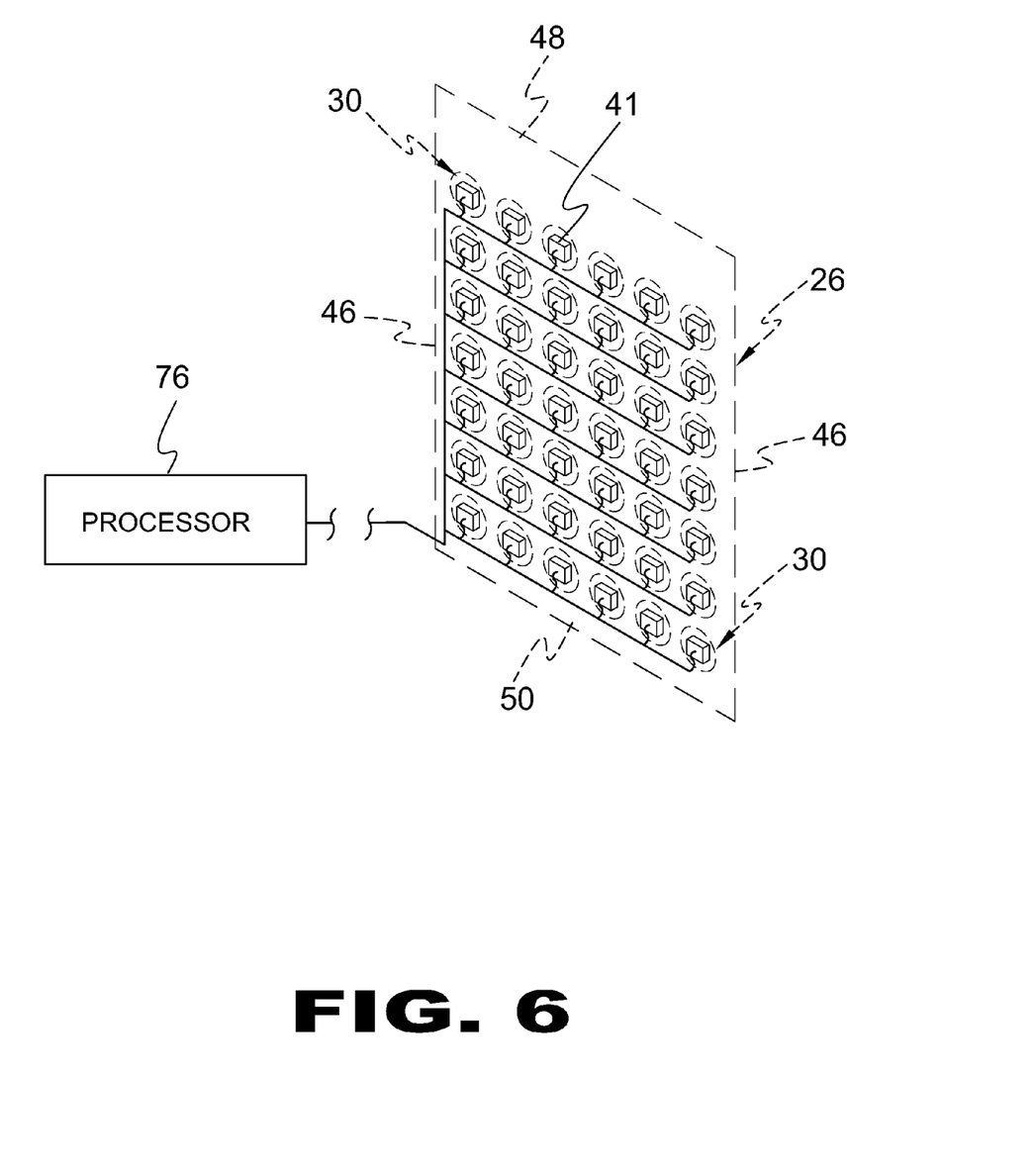
FIG. 6 is an illustrative view of the computer application controlled illuminable elements.

Referring to FIG. 6, shown is an illustrative view of the computer application controlled illuminable elements. Illustrated is a plurality of target elements 30 with a corresponding number of lights that are illuminated through a computer application. The computer application provides for the selection of a pitching module that will illuminate a random target element 30, where then the batter 22 hits the illuminated target element 30. The target element 30 may incorporate a sensor 64, such as a motion detector, to detect impact on the desired target element 30, where then the computer application may display a message on the optional message display 66 or optional display monitor 28.

Figure 7:
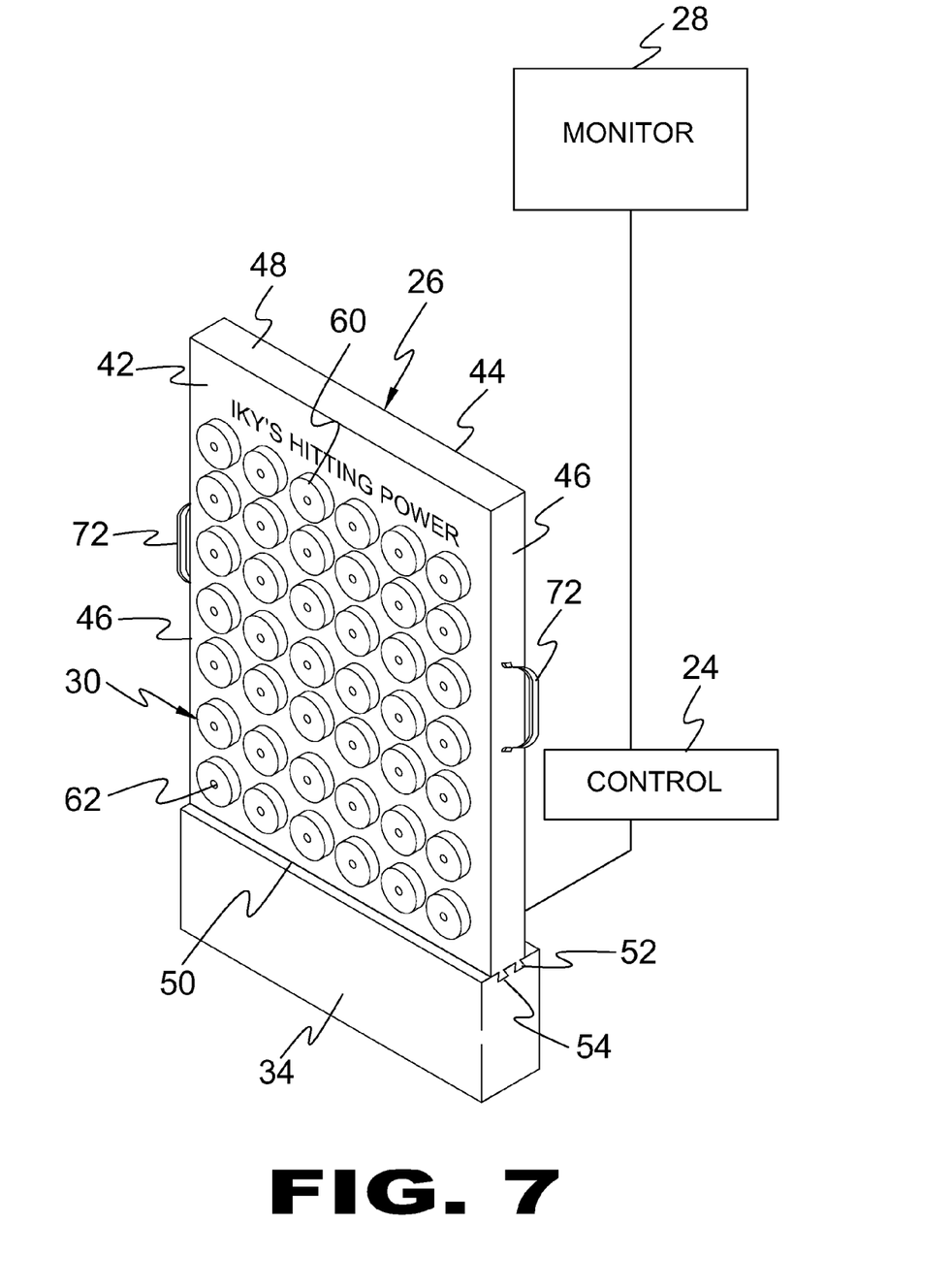
FIG. 7 is an illustrative view of an additional element of the present invention.

Referring to FIG. 7, shown is an illustrative view of an additional element of the present invention. The present invention provides for the incorporation of a display monitor 28 that would depict a pitcher pitching. As aforementioned, a computer application controlled illuminable target element 30 is illuminated as the batter's target, which may be in or out of the strike zone. The computer program controls which of the target elements 30 are illuminated depending on which of the computer programs from the control module is selected. Selection may be for batting practice of a particular type of pitch or may be a random target element 30 illumination. A video clip may be associated with a particular pitch and a particular pitcher delivery system, such as left or right handed, pitching overhead or side arm, etc. and varying the illumination of a target element 30 reflecting the speed of the pitch.

Figure 8:
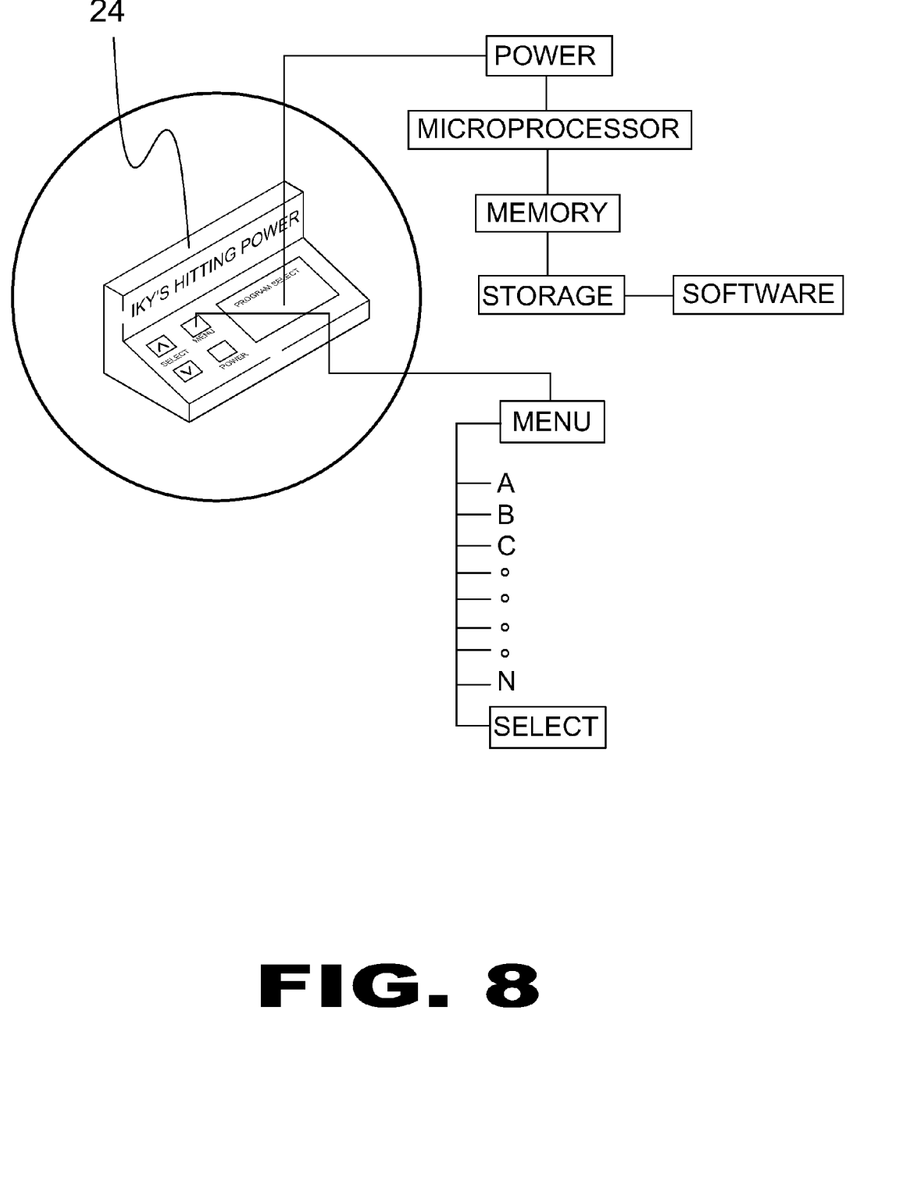
FIG. 8 is an illustrative view of an embodiment of the control module of the present invention.

Referring to FIG. 8, shown is an illustrative view of an embodiment of the control module of the present invention. The present invention provides a control module 24 for engaging and disengaging a batting practice session. Computer hardware and a computer application are accessible from the control module 24 for selecting pitching that may be comprised of random target elements 30 illumination or illuminate specific target elements 30 designed for specific batting practice, such as random inside pitching high or low. When the display monitor 28 is incorporated, a video clip may be associated with a particular pitch and a particular pitcher delivery system when the optional display monitor 28 is incorporated, as shown in FIG. 9.

Figure 9:
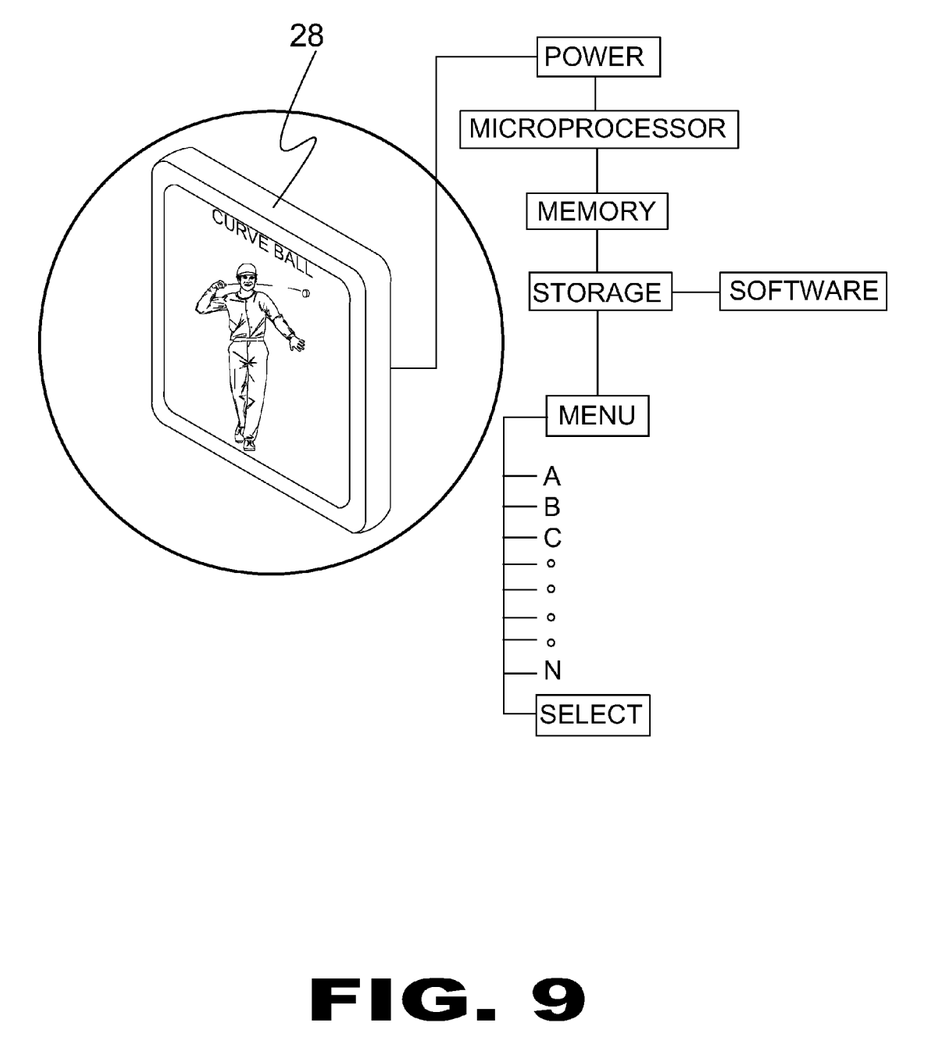
FIG. 9 is an illustrative view of monitor of the present invention.

Referring to FIG. 9, shown is an illustrative view of monitor of the present invention. The present invention provides for the incorporation of the display monitor 28 that would depict a pitcher pitching. As aforementioned, a computer application controlled illuminable target element 30 is illuminated as the batter's target, which may be in or out of the strike zone. The computer program controls which of the target elements 30 are illuminated depending on which of the computer programs from the control module 24 is selected. Selection may be for batting practice of a particular type of pitch or may be a random target element 30 illumination. A video clip may be associated with a particular pitch and a particular pitcher delivery system, such as left or right handed, pitching overhead or side arm, etc. with the computer programs from the control module 24 varying the illumination of a target element 30 reflecting the speed of the pitch. For example, a pitch traveling at 95 mph takes approximately 0.43 seconds to reach home plate and a pitch traveling at 85 mph will take approximately 0.52 seconds to reach home plate.

Figure 10:
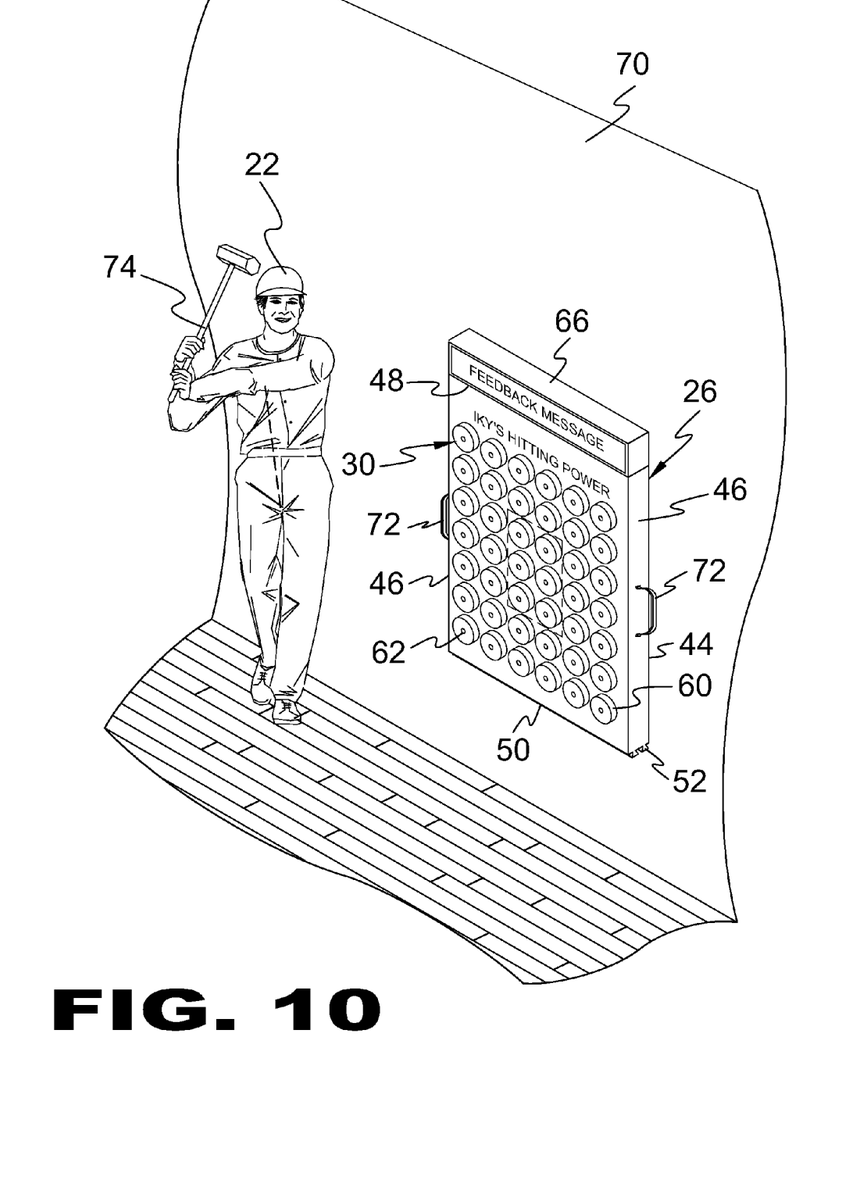
FIG. 10 is a perspective view of the batting target mounted to an interior wall.

Referring to FIG. 10, shown is a perspective view of the batting target mounted to an interior wall. The present invention provides an additional element comprising a wall mount fastener 68, so that the battering target 26 target can be brought inside and mounted to a wall 70 (shown in FIG. 11) during inclement or winter weather. Also shown is the battering target 26 having a pair of side mounted handles 72 for carrying and mounting the batting target 26 to a structure, such as the wall 70. Additionally shown is a sledge hammer 74 serving as the bat 32, which will develop the batter's upper body strength. Furthermore, the top mounted message display 66 working in conjunction with each target element 30 and a processor 76 provides swing feedback to the batter 22, for example late, early, properly hit, saying if it is a home run, etc.

Figure 11:
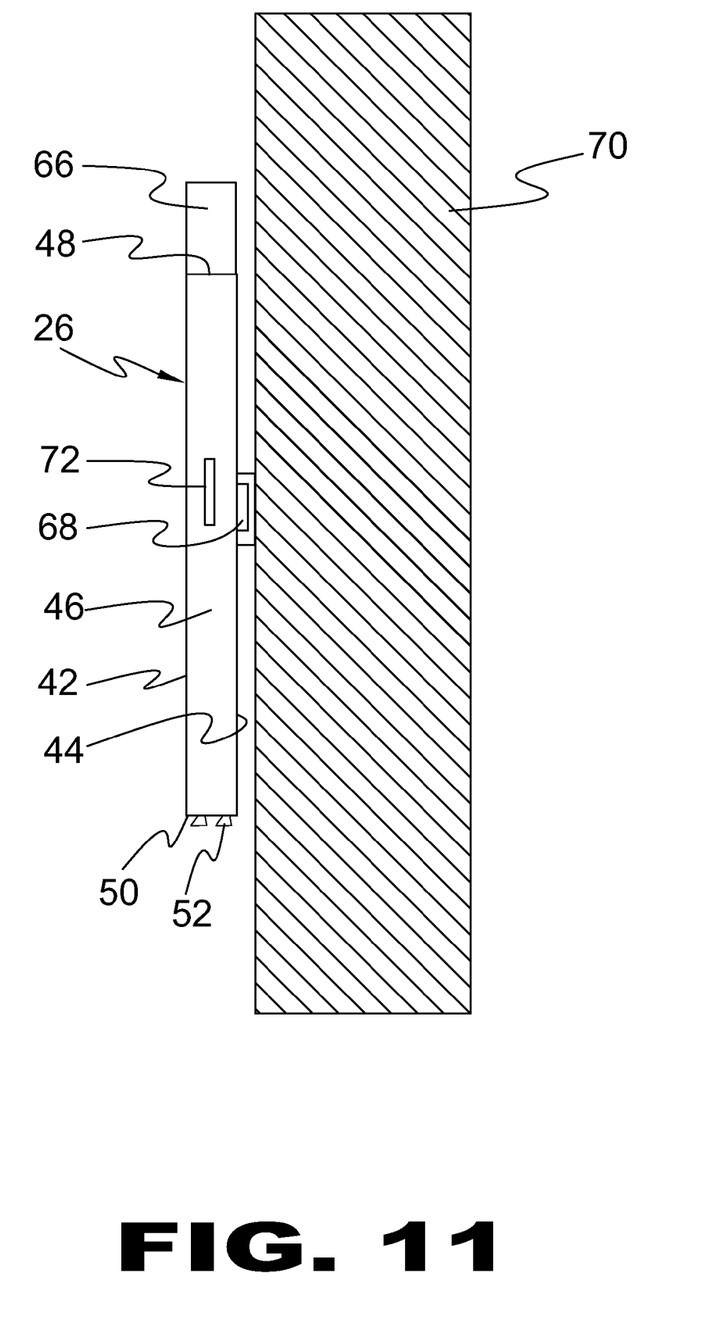
FIG. 11 is a side view of the batting target mounted to an interior wall.

Referring to FIG. 11, shown is a side view of the batting target mounted to an interior wall. The present invention provides an additional element comprising a wall mount fastener 68, so that the batting target 26 can be brought inside and mounted to the wall 70 during inclement or winter weather.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A batting practice device comprising;
 a computer controlled batting target having a plurality of illuminable target elements that are randomly illuminated by a computer program, whereby a batter can increase body strength and batting skills;
 said batting target comprising a front wall having a plurality of recessed receptacles;
 each target element comprising an impact portion with a rearwardly depending wall extending into a receptacle containing an illuminable portion;
 a resilient compression element for joining said target element and said front wall for absorbing a force applied to said target element and returning the impact portion to its original position and providing feedback when the impact portion is impacted;
 a light spaced away from said target element to project a beam of light onto the illuminable portion of said target element, said target element having an aperture for passage of a beam of light;
 a motion sensor for measuring movement of said impact portion;
 a computer system having an application for controlling each light, selecting a pitching module for illuminating selected target elements, which target elements are hit by the batter, measuring impact on a target element, and displaying said feedback; and a message display mounted on said batting target for providing feedback for each swing taken by a batter, after the batter impacts one of the target elements, said feedback including whether a swing was early, late, properly hit, and a home run.

2. The device as recited in claim 1, wherein the batting target comprises a circuit having a power source, memory and software in electrical communication with a control module, whereby the batter can actuate the control module and select from a plurality of pitching programs.

3. The device as recited in claim 1, further comprising a control module, whereby the batter can select a particular pitching program from a plurality of pitching programs, such as fast ball, knuckle ball, slider, curve, high ball, low ball, inside pitch, outside pitch and a completely random program that will illuminate any of the illuminable target elements.

4. The device as recited in claim 1, wherein the batting target comprises a base as an anchor to prevent movement of the batting target during use.

5. The device as recited in claim 1, wherein the feedback comprises an actuator, such as a sensor, that displays a computer programmed message on both a monitor and target display, whereby the monitor can be used by the computer program to display a pitcher pitching a ball at the batting target, whereby in realistic time one of the target elements will illuminate.

* * * * *